US012612078B2

(12) United States Patent
Schaumann et al.

(10) Patent No.: US 12,612,078 B2
(45) Date of Patent: Apr. 28, 2026

(54) METHOD FOR CONTROLLING AN EGO VEHICLE BASED ON SAFETY REGIONS

(71) Applicant: Robert Bosch GmbH, Stuttgart (DE)

(72) Inventors: Arno Schaumann, Ludwigsburg (DE); Heiko Freienstein, Weil der Stadt (DE); Joram Berger, Heimsheim (DE); Markus Schuetz, Tuebingen (DE); Steffen Knoop, Hohenwettersbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 96 days.

(21) Appl. No.: 18/529,267

(22) Filed: Dec. 5, 2023

(65) Prior Publication Data

US 2024/0208540 A1 Jun. 27, 2024

(30) Foreign Application Priority Data

Dec. 21, 2022 (DE) ..................... 10 2022 214 143.1

(51) Int. Cl.
*B60W 60/00* (2020.01)

(52) U.S. Cl.
CPC ..... *B60W 60/0016* (2020.02); *B60W 2554/80* (2020.02); *B60W 2556/40* (2020.02); *B60W 2720/10* (2013.01)

(58) Field of Classification Search
CPC ......... B60W 60/0016; B60W 2556/40; B60W 2554/80; B60W 2720/10
See application file for complete search history.

(56) References Cited

U.S. PATENT DOCUMENTS

| | | | | |
|---|---|---|---|---|
| 11,760,381 | B1 * | 9/2023 | Gray ..................... | B60W 50/00 701/23 |
| 2025/0033669 | A1 * | 1/2025 | Shalev-Shwartz .......................... | B60W 40/105 |

FOREIGN PATENT DOCUMENTS

| | | |
|---|---|---|
| DE | 102010025612 A1 | 3/2011 |
| DE | 102010021591 A1 | 12/2011 |
| DE | 102011103936 A1 | 12/2012 |
| DE | 112020002546 T5 | 2/2022 |
| DE | 112020004474 T5 | 8/2022 |

* cited by examiner

*Primary Examiner* — Hitesh Patel
*Assistant Examiner* — Terry C Buse
(74) *Attorney, Agent, or Firm* — NORTON ROSE FULBRIGHT US LLP

(57) ABSTRACT

A method for controlling an ego vehicle. The method includes: receiving map data of a map representation of a surrounding environment of an ego vehicle; determining a safe driving corridor of the ego vehicle based on the map data of the map representation; determining a safety region of the ego vehicle based on a state of motion of the ego vehicle; checking whether the safety region is located completely within the safe driving corridor during travel of the ego vehicle along a travel trajectory; and outputting a control signal for executing a safety maneuver if the safety region is located at least partially outside the safe driving corridor.

14 Claims, 7 Drawing Sheets

100 receive position data
and determine position receive map data receive environment
sensor data and
execute object
recognition determine state
of motion of ego
vehicle

125

101

123

127 calculate
extended
safety region calculate safe
driving
corridor

103 calculate
safety
region

105

111 check
whether
dynamic
object is
located in
extended
safety region geometric
comparison
of surface of
safety
region and
surface of safe
driving corridor

129

107

113

129 calculate whether
safety region is
located completely in
safety driving
corridor

115 execution of safety
maneuver can be
terminated or prevented output control signal
for executing
safety maneuver

109

117

119

121 emergency
braking speed
reduction initiate steering movement

FIG. 7

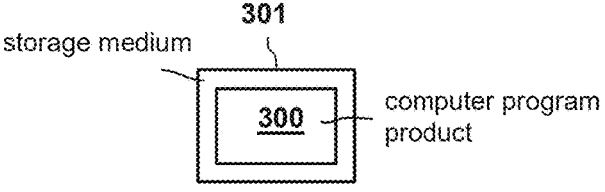

storage medium

301

300 computer program
product

METHOD FOR CONTROLLING AN EGO VEHICLE BASED ON SAFETY REGIONS

CROSS REFERENCE

The present application claims the benefit under 35 U.S.C. § 119 of German Patent Application No. DE 10 2022 214.143.1 filed on Dec. 21, 2022, which is expressly incorporated herein by reference in its entirety.

FIELD

The present invention relates to a method for controlling an ego vehicle.

BACKGROUND INFORMATION

For automatic control of vehicles, the safe driving of the vehicle is essential. In the related art, a plurality of driver assistance systems are described which support avoidance of collisions with other road users.

SUMMARY

It is an object of the present invention to provide an improved method for controlling an ego vehicle.

This object may achieved by a method for controlling an ego vehicle of the present invention. Advantageous embodiments of the present invention are disclosed herein.

According to one aspect of the present invention, a method for controlling an ego vehicle is provided. According to an example embodiment of the present invention, the method comprises:

receiving map data of a map representation of a surrounding environment of an ego vehicle, wherein the map data of the map representation map at least one roadway traveled by the ego vehicle;

determining a safe driving corridor of the ego vehicle based on the map data of the map representation, wherein the safe driving corridor describes a spatial region that can be traveled by the ego vehicle without collision, and wherein the safe driving corridor is limited at least by boundaries of the roadway;

determining a safety region of the ego vehicle based on a state of motion of the ego vehicle, wherein the state of motion is defined at least by a speed value and an acceleration value of the ego vehicle, wherein the safety region defines a spatial region in which, in a given state of motion, the ego vehicle can be safely brought to a standstill, and wherein a length of the safety region oriented along a direction of travel of the ego vehicle and/or a width of the safety region oriented along a direction perpendicular to the direction of travel are determined taking into account a speed and an acceleration of the ego vehicle;

checking whether the safety region is located completely within the safe driving corridor during travel of the ego vehicle along a travel trajectory, and outputting a control signal for executing a safety maneuver if the safety region is located at least partially outside the safe driving corridor.

This can achieve the technical advantage of providing an improved method for controlling an ego vehicle. For this purpose, a safe driving corridor of the ego vehicle is first calculated based on map data of a map representation. The safe driving corridor is a spatial region that can be traveled by the ego vehicle without collisions, according to the map representation. The absence of collisions here primarily relates to collisions of the ego vehicle with objects statically situated in the surrounding environment of the ego vehicle. The safe driving corridor is limited to the area of the roadway, in accordance with the prevailing traffic regulations. The safe driving corridor is thus limited at least by the boundaries of the roadway traveled by the ego vehicle. To calculate the safe driving corridor, in addition to the map data of the map representation an item of position information of the vehicle relative to the map representation can also be taken into account. In addition to the safe driving corridor, a safety region of the ego vehicle is calculated according to the present invention, taking into account a state of motion of the vehicle. The state of motion is defined here at least by a speed value and an acceleration value of the ego vehicle. The safety region of the ego vehicle describes a spatial region in which, in the given state of motion, the ego vehicle can be safely brought to a standstill. By taking the acceleration value into account in determining the safety region, it is possible to take changes in the speed of the ego vehicle into account in the calculation of the safety region. As a result, the dimensions of the safety region can be adapted particularly precisely to the actual state of motion of the ego vehicle.

According to an example embodiment of the present invention, for the controlling of the ego vehicle it is checked whether the previously calculated safety region is completely located within the safe driving corridor at all times during the travel of the ego vehicle along a planned travel trajectory.

If, on the other hand, it is determined that the safety region is at least partially outside the safe driving corridor, a control signal for executing a safety maneuver is output in accordance with the present invention. By taking into account the safety region according to the present invention and by checking the location of the safety region within the safe driving corridor, safe travel of the ego vehicle can be ensured in which a safety maneuver is automatically executed as soon as the safety region calculated according to the state of motion of the ego vehicle is not completely within the safe driving corridor.

According to an example embodiment of the present invention, the safety region describes a spatial area in which, in a given state of motion, the ego vehicle can be braked to a standstill when an event occurs. In the case in which the safety region is no longer completely within the safe driving corridor, however, it cannot be ensured that the ego vehicle can be braked to a standstill within the safe driving corridor if an unforeseen event occurs. The ego vehicle could therefore leave the safe driving corridor when the event and the subsequent braking process occur, which in turn could lead to a collision between the ego vehicle and obstacles outside the safe driving corridor.

According to an example embodiment of the present invention, both the safe driving corridor and the safety region can be determined or calculated repeatedly during the travel of the ego vehicle along the travel trajectory. The checking of the location of the safety region within the safe driving corridor can thus likewise be carried out repeatedly for different positions of the ego vehicle during the travel along the trajectory.

According to an example embodiment of the present invention, by checking the location of the safety region within the safe driving corridor for the travel of the ego vehicle along the planned travel trajectory, collisions that can occur due to incorrectly planned or incorrectly implemented travel trajectories can in particular be avoided. In the case of a travel trajectory in which the safety region is located completely within the safe driving corridor at all times, it can be ensured that the ego vehicle can be brought to a standstill within the safe driving corridor even given the occurrence of an unforeseen event and the braking process that is then to be executed. According to the present invention, the safety region describes the spatial region which is required when an event occurs in order to brake the ego vehicle to a standstill in its particular state of motion. If the safety region is not completely within the safe driving corridor at all times when following a travel trajectory, it must be assumed that if an event occurs in the positions of the travel trajectory in which the safety region is at least partially outside the safe driving corridor, during the braking process the ego vehicle will be moved past the boundaries of the safe driving corridor and will thus at least partially leave the safe driving corridor. For such travel trajectories, it can thus no longer be ensured that the ego vehicle will remain within the safe driving corridor at all times. Collisions of the ego vehicle with obstacles or objects outside the safe driving corridor thus cannot be ruled out. By taking the safety region into account, the safety of the controlling of the ego vehicle can thus be improved.

Within the meaning of the application, the ego vehicle can be a partially automated, highly automated, or fully automated controllable vehicle. Road users can include other vehicles, in particular trucks, cars, buses, motorcycles, or bicycles. Within the meaning of the application, a roadway can be a highway, a country road, a city road, a traffic-calmed road, a road on private property, or a parking lot.

According to one example embodiment of the present invention, the method further comprises:

determining an extended safety region based on the speed value and/or the acceleration value of the state of motion of the ego vehicle and taking into account an object movement model for dynamic objects, wherein the object movement model comprises a description of an average movement of dynamic objects located in the surrounding environment of the ego vehicle, wherein the extended safety region defines a spatial region in which, in a given state of motion, the ego vehicle can be brought to a standstill without a collision with a dynamic object moving at least partially in the direction of the ego vehicle according to the object movement model, and wherein a length and/or width of the extended safety region are determined taking into account the speed value and the acceleration value of the ego vehicle;

checking whether a dynamic object is located within the extended safety region; and outputting the control signal to execute a safety maneuver if the safety region is located at least partially outside the safe driving corridor, and/or if at least one dynamic object is located in the extended safety region.

This can achieve a technical advantage that the safety of the ego vehicle can be further improved. For this purpose, an extended safety region is calculated, by means of which dynamic objects can be taken into account. The extended safety region is calculated analogously to the safety region, taking into account the speed value and the acceleration value of the state of motion of the ego vehicle. Furthermore, when calculating the extended safety region an object movement model of dynamic objects located in the surrounding environment of the ego vehicle is taken into account. The object movement model describes an average movement of dynamic objects located in the environment of the ego vehicle. The extended safety region thus describes a spatial region within which the ego vehicle, in the given state of motion, can move without a collision with a dynamic object, located in the environment of the ego vehicle, that dynamically moves within the environment of the ego vehicle according to the object movement model. According to the present invention, in addition to checking the arrangement of the safety region within the safe driving corridor, a check is carried out as to whether a dynamic object located within the environment of the ego vehicle is located within the extended safety region. If a dynamic object is located within the extended safety region, the control signal described above is output to execute the safety maneuver. Collisions of the ego vehicle with dynamic objects can thus be avoided through the extended safety region. No prediction of the behavior of the dynamic objects is required for this purpose. Instead, the object movement model based on the average behavior is taken into account in calculating the extended safety region. If, when following the planned trajectory, the ego vehicle determines that a corresponding dynamic object is located within the extended safety region, the above-mentioned safety maneuver is automatically executed. A prediction of the behavior of the detected object is not taken into account here. The taking into account of the extended safety region is thus an effective safeguard for the ego vehicle prior to the performed behavioral prediction. Independently of the prediction of the behavior of the detected dynamic object that may be carried out, the ego vehicle is automatically activated to execute the safety maneuver as soon as the detected dynamic object is within the extended safety region. A collision of the ego vehicle with the detected dynamic object can thereby be avoided. The dynamic objects here may be further road users, in particular pedestrians. By taking the speed value into account when calculating the extended safety region, a change in speed can be included in the determination of the dimensions. In this way, the extended safety region can be better adapted to the actual state of motion of the ego vehicle.

According to one example embodiment of the present invention, the length and/or the width of the safety region and/or of the extended safety region are adapted during the travel of the ego vehicle based on the current speed value and/or the current acceleration value of the current state of motion of the ego vehicle.

This can achieve a technical advantage that the safety regions can be adapted exactly to the current state of motion during the travel. By taking the acceleration value into account, changes in speed can be included in the calculation of the dimensions of the safety regions. As a result, the dimensions of the safety regions can be better adapted to the actual movement of the vehicle. At reduced speed or even during deceleration, the safety regions can be reduced accordingly without thereby risking collisions of the ego vehicle with objects.

According to one example embodiment of the present invention, the method further comprises:

terminating and/or not executing the safety maneuver if, after adapting the length and/or width, the safety region is completely located in the safe travel corridor, and/or if, after adapting the length and/or width of the extended safety region, the object is located outside the extended safety region.

This can achieve a technical advantage that there is no unnecessary execution of the safety maneuvers. If, when checking the current state of motion and when adapting the safety region to the current state of motion, it is detected that the newly adapted safety region is again located completely in the safe driving corridor and there is thus no need to execute the safety maneuver, the execution of the safety maneuver can be stopped. As a result, unnecessary safety maneuvers are avoided and the controlling of the ego vehicle is improved.

According to one example embodiment of the present invention, a Kalman filter is used to determine a future speed value and/or a future acceleration value of a future state of motion of the ego vehicle based on the speed value and/or the acceleration value of the state of motion of the ego vehicle, wherein the length and/or width of the safety region and/or of the extended safety region are adapted based on the future speed and/or acceleration of the ego vehicle.

This can achieve a technical advantage that a precise acceleration value is achieved by the Kalman filter based on the measured acceleration value of the sensor system and the planned acceleration value of the planning module.

According to one example embodiment of the present invention, the length of the safety region and/or the extended safety region comprises a latency length and a deceleration length, wherein the deceleration length describes a distance required to brake the ego vehicle to a complete stop, and wherein the latency length describes a distance which the ego vehicle continues to travel without deceleration between an initiation time at which an event occurs that is intended to trigger a deceleration of the ego vehicle and a deceleration time at which the deceleration is actually effected, and wherein a speed of the ego vehicle during a latency period is determined taking into account the acceleration value.

This can achieve a technical advantage that a precise calculation of the dimensions of the safety regions is made possible. By taking the acceleration value into account, the current speed of the ego vehicle during the latency period between the initiation time and the actual deceleration time can be adapted more precisely to the actual speed of the vehicle.

According to one example embodiment of the present invention, the acceleration value of the state of motion describes a reduction in speed or an increase in speed of the ego vehicle.

This can achieve a technical advantage that a precise adaptation of the dimensions of the safety regions to the current state of motion of the ego vehicle is achieved.

According to one example embodiment of the present invention, the acceleration value comprises an acceleration value planned by a planning module and/or an acceleration value of the ego vehicle measured by a corresponding sensor system.

This can achieve a technical advantage that a precise adaptation of the dimensions of the safety regions to the current state of motion of the ego vehicle is achieved.

According to one example embodiment of the present invention, the planned acceleration value and/or the current acceleration value of the ego vehicle are taken into account in a common processing path or in two parallel processing paths for determining the safety region and/or the extended safety region.

This can achieve a technical advantage that a precise adaptation of the dimensions of the safety regions to the current state of motion of the ego vehicle is achieved.

According to one example embodiment of the present invention, the safety maneuver comprises:

executing an emergency braking in which the ego vehicle is brought to a safe standstill, deviating from a planned travel trajectory, and/or executing a speed reduction in a deviation from a planned travel trajectory of the ego vehicle, the speed reduction taking place in such a way that the safety region is again located completely in the safe driving corridor, and/or executing a steering movement deviating from the planned travel trajectory of the ego vehicle, the steering movement taking place in such a way that the safety region is again located completely in the safe driving corridor.

This can achieve a technical advantage that the safety of the controlling of the ego vehicle can be further improved. For this purpose, the safety maneuver to be executed comprises an emergency braking in which the ego vehicle is automatically brought to a standstill, deviating from the planned travel trajectory. Alternatively or additionally, the safety maneuver can comprise a speed reduction in which the ego vehicle is braked but not brought to a standstill. In this case, the speed of the ego vehicle can be reduced in such a way that the safety region is again located completely within the safe driving corridor. The safety region describes the spatial region required for braking the ego vehicle to a standstill. The length of the safety region oriented in the direction of travel of the ego vehicle therefore depends on, among other things, the speed of the ego vehicle. By reducing the speed of the ego vehicle, the length of the safety region can be reduced. The speed can therefore be reduced in such a way that the safety region, correspondingly reduced in its area, is located completely within the safe driving corridor for all positions of the planned travel trajectory. The reduced speed and the correspondingly reduced braking distance required by the ego vehicle, which is reflected in the length of the safety region, can in turn ensure that the ego vehicle can be braked to a standstill at any time when an event occurs without the ego vehicle leaving the safe driving corridor.

Alternatively or additionally, a corresponding steering process of the ego vehicle can be carried out in which it is controlled, deviating from the planned travel trajectory, in such a way that, due to the changed direction of travel, the safety region is again completely within the safe driving corridor and the ego vehicle can be brought to a standstill within the driving corridor when an event occurs. The safety region describes a spatial region required for braking the ego vehicle to a standstill. The orientation of the safety region therefore depends on the direction of travel of the ego vehicle. When the direction of travel changes, the orientation of the safety region changes accordingly in relation to the safe travel corridor, which is primarily determined by the orientation of the roadway traveled on. By executing a steering process in the form of lateral controlling of the ego vehicle, the orientation of the safety region relative to the safe driving corridor can thus be changed in such a way that the safety region is once again located completely within the safe driving corridor. The shape and/or size of the safety region can remain to the greatest possible extent unchanged by the steering movement of the ego vehicle.

According to one example embodiment of the present invention, at least one static object located at least partially on the roadway is detected by an object recognition executed based on ambient sensor data of at least one environmental sensor of the ego vehicle, the safe driving corridor being limited by the at least one static object (for example a vehicle) located at least partially on the roadway.

This can achieve a technical advantage that a further improvement of the safety of the ego vehicle is made possible. For this purpose, to calculate the safe driving corridor information from an object recognition executed based on environmental sensor data is taken into account in addition to the information from the map representation. For this purpose, detected static objects which are located at least partially on the roadway traveled by the ego vehicle can be taken into account for calculating the safe driving corridor. The objects can be, for example, parked vehicles or other static objects at the side of the road that are not explicitly shown in the map representation. By taking into account such static objects on the side of the road, a precise safe driving corridor can be calculated. The safe driving corridor is limited both by the roadway boundaries and by the objects located at least partially on the roadway.

According to one embodiment of the present invention, at least one prevailing traffic regulation is recognized by the object recognition performed on environmental sensor data from at least one environmental sensor of the ego vehicle, the safe driving corridor being limited by the at least one recognized prevailing traffic regulation.

This can achieve a technical advantage that the safety of the controlling of the ego vehicle can be further improved. For this purpose, recognized traffic regulations are also taken into account in calculating the safe driving corridor. For example, stop lines at stop signs can be taken into account to limit the safe driving corridor.

According to one example embodiment of the present invention, the state of motion is additionally defined by an item of position information.

This can achieve a technical advantage that a precise safety region can be calculated taking into account the state of motion.

According to one example embodiment of the present invention, a length of the extended safety region oriented in the direction of travel of the ego vehicle and/or a width of the extended safety region oriented perpendicularly to the direction of travel and/or to the trajectory of the ego vehicle corresponds to a path distance within which the ego vehicle, in the given state of motion, can be brought to a standstill at maximum deceleration power without colliding with an object moving towards the ego vehicle in the opposite direction of travel or in a direction perpendicular to the direction of travel, according to the movement model.

This can achieve a technical advantage that a precise extended safety region can be calculated taking into account the state of motion of the ego vehicle and the movement model of the dynamic object.

According to one example embodiment of the present invention, a width of the safety region oriented perpendicularly to the direction of travel of the ego vehicle and/or a width of the extended safety region corresponds to at least one width of the ego vehicle.

This can achieve a technical advantage that a precise safety region or extended safety region can be determined.

According to one example embodiment of the present invention, the safety region and/or the extended safety region each comprise a spatial area in the direction of travel directly in front of and/or behind and/or next to the ego vehicle.

This can achieve a technical advantage that safety regions, or extended safety regions, can be calculated for different driving situations.

According to one example embodiment of the present invention, the state of motion further comprises an item of steering information relating to a possible steering power of the ego vehicle, the width of the safety region being determined taking into account the steering position and a steering inaccuracy of the ego vehicle.

This can achieve a technical advantage that the safety region can be oriented along the immediately imminent movement, and steering inaccuracies can also be taken into account. For this purpose, the width of the safety region is dependent on the steering power of the ego vehicle. The steering power here includes steering inaccuracies of the ego vehicle. Steering inaccuracies contribute to the accuracy of controlling the ego vehicle. This in turn contributes to the spatial region required for complete braking of the ego vehicle. By taking the steering inaccuracies into account when calculating the safety region, a precise safety region can be calculated.

According to one example embodiment of the present invention, the arrangement of the safety region within the safe driving corridor and/or the checking of the positioning of the dynamic object in the extended safety region takes place via a geometric comparison of a surface of the safety region with a surface of the safe driving corridor and/or via a geometric comparison of a surface of the extended safety region with a position of the dynamic object.

This can achieve a technical advantage that a precise check of the safety region or of the extended safety region is enabled. For this purpose, geometric comparisons of the surfaces of the safety regions or extended safety regions are carried out with the safe driving corridor or the positions of the dynamic objects. As a result, it can be precisely determined whether the safety region is located completely in the safe driving corridor, or whether a dynamic object is located within the extended safety region.

According to one example embodiment of the present invention, the static objects comprise infrastructure objects and/or parked vehicles, while the dynamic objects comprise other road users.

This can achieve the technical advantage that static or dynamic objects commonly encountered in road traffic can be taken into account in the form of static infrastructure objects, vehicles, or other road users.

According to one example embodiment of the present invention, the static objects are classified as potentially dynamic objects, wherein for potentially dynamic objects a probability of a dynamic behavior of the object at a future time is not equal to zero.

In this way, a technical advantage can be achieved that it is possible to distinguish between static objects, such as infrastructure objects, for which potential dynamic behavior can be disregarded, and potentially dynamic objects which are static, i.e. motionless, at the time of detection, but which may execute a movement at a later time. The potentially dynamic objects can be, for example, standing pedestrians who are motionless at the time of the environmental detection but for whom it cannot be ruled out that they will execute a movement at a future time. The possible movement of the potentially dynamic objects can be taken into account when calculating the safe driving corridor and/or the extended safety region or the extended safety region. This enables a more precise calculation of the safe driving corridor and/or the safety regions and, as a result, greater safety of the control of the vehicle.

According to one example embodiment of the present invention, the environmental sensor data comprise camera data, LiDAR data, radar data, and/or acoustic data.

This can achieve a technical advantage that a precise object recognition is made possible.

According to a further aspect of the present invention, a computing unit is provided which is configured to carry out the method for controlling an ego vehicle according to one of the above-described embodiments.

According to a further aspect of the present invention, a computer program product is provided comprising commands that, when the program is executed by a data processing unit, cause the data processing unit to execute the method for controlling an ego vehicle according to one of the above-described embodiments.

Exemplary embodiments of the present invention are explained with reference to the figures.

BRIEF DESCRIPTION OF THE DRAWINGS

FIG. 7 is a flowchart of a method for controlling an ego vehicle, according to an example embodiment of the present invention.

FIG. 8 is a schematic representation of a computer program product, according to an example embodiment of the present invention.

DETAILED DESCRIPTION OF EXAMPLE EMBODIMENTS

Figure 1:
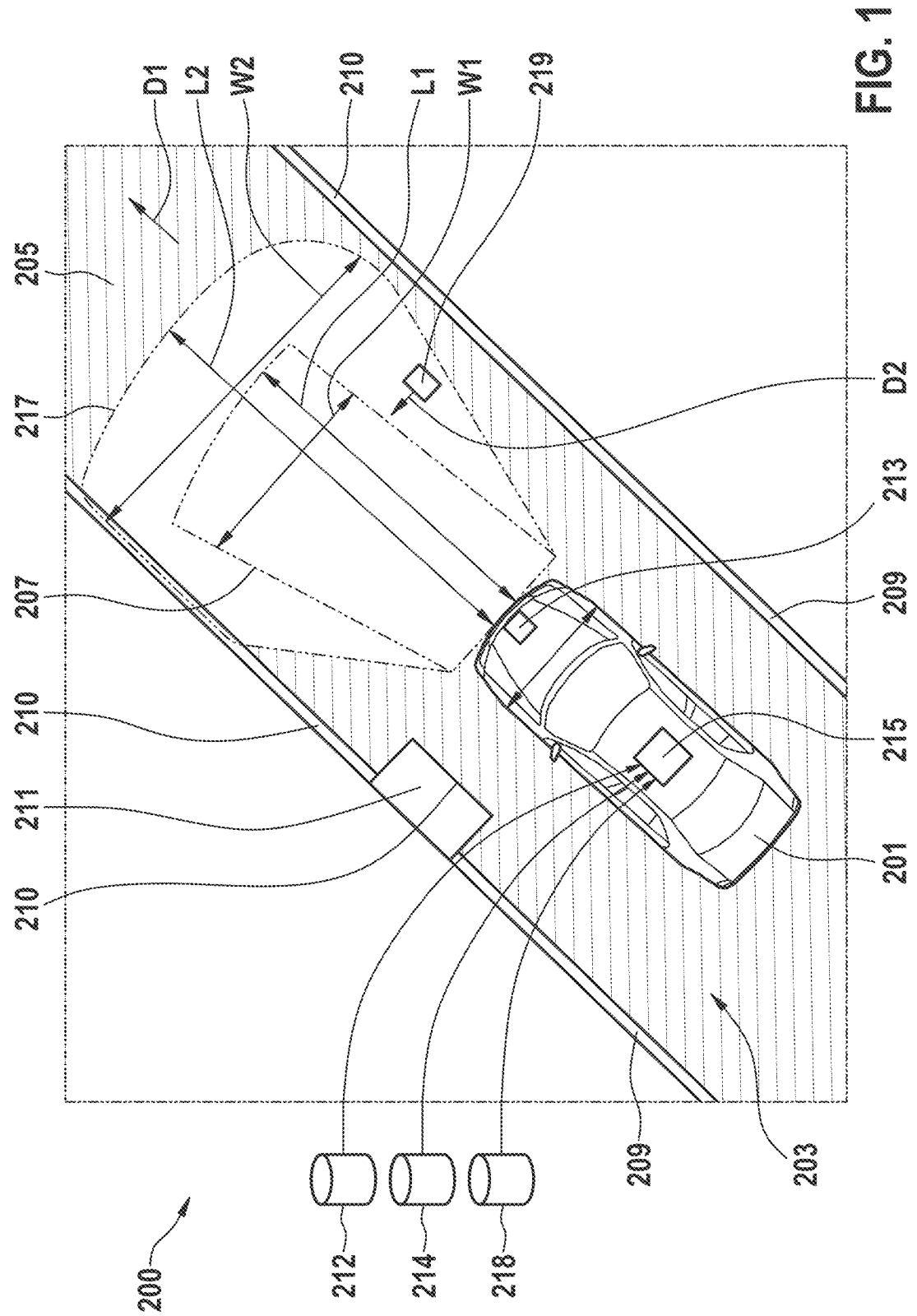
FIG. 1 is a schematic representation of a system for controlling an ego vehicle according to one example embodiment of the present invention.

FIG. 1 is a schematic representation of a system 200 for controlling an ego vehicle 201 according to one embodiment.

FIG. 1 shows an ego vehicle 201 driving on a roadway 203 in a direction of travel D1. The ego vehicle 201 comprises a computing unit 215 which is configured to carry out the method 100 according to the present invention to control an ego vehicle 201. The ego vehicle further comprises at least one environmental sensor 213.

To carry out the method 100 according to the present invention, map data 212 of a map representation of the surrounding environment of the ego vehicle 201 are first received by the computing unit 215. The map data 212 map at least the roadway 203 traveled by the ego vehicle 201. The map display can be given, for example, by a topological map or by a feature map of the surrounding environment of the ego vehicle 201.

Based on the map data 212, according to the present invention a safe driving corridor 205 is calculated by the computing unit 215. The safe driving corridor 205 describes a spatial region that can be traveled by the ego vehicle 201 without collision. The safe driving corridor 205 calculated on the basis of the map data 212 of the map representation is limited at least by roadway boundaries 209 of the roadway 203. The safe driving corridor 205 thus describes the region of the roadway 203 that can be traveled according to the map data 212. The safe driving corridor 205 can furthermore be limited to individual lanes of the roadway 203, in particular if these can be traveled on in different directions of travel.

According to the embodiment shown, the safe driving corridor 205 is further calculated taking into account an object recognition carried out on environmental sensor data 214 of the at least one environmental sensor 213. In the embodiment shown, at least one object 211 located at least partially on the lane 203 is located in the environment of the ego vehicle 201. According to the present invention, the object 211 located at least partially on the roadway 203 is recognized by a correspondingly trained object recognition as a static object, based on the environmental sensor data 214. Based on the results of the object recognition, the detected object 211 is taken into account when calculating the safe driving corridor 205. The boundaries 210 of the safe driving corridor 205 are thus calculated taking into account the relevantly detected static object 211.

The safe driving corridor 205 is thus limited at least by the roadway boundaries 209, or by the objects 211 located at least partially on the roadway 203. The static objects 211 can be, for example, infrastructure objects or, for example, parked vehicles, which are located in stationary fashion in the environment of the ego vehicle 201 but are not noted in the map representation.

The safe driving corridor 205 can also be limited by traffic signs (not shown in FIG. 1), such as stop lines or traffic signs or traffic lights. For this purpose, according to one embodiment corresponding traffic signs can be recognized based on the object recognition of the environment of the ego vehicle 201.

According to the present invention, a safety region 207 is further calculated taking into account a state of motion of the ego vehicle 201. The safety region 207 here describes a spatial region in which the ego vehicle 201, in the given state of motion, can be braked to a standstill when an event occurs.

The state of motion of the ego vehicle 201 here comprises a speed value and an acceleration value of the ego vehicle 201. The state of motion can in addition comprise an item of position information relating to a position of the ego vehicle 201 relative to the map representation.

The acceleration value can describe a speed increase or a speed reduction in the form of a braking of the ego vehicle 201.

The acceleration value can describe an acceleration of the ego vehicle 201 that is planned by a planning module 229 and is thus in the future. Alternatively or additionally, the acceleration value can describe an actual acceleration of the ego vehicle 201 which is based on measured values of a corresponding sensor system of the ego vehicle 201.

A length L1 of the safety region 207 oriented in the direction of travel D1 thus describes a braking distance required when an event occurs with application of full braking power of the ego vehicle 201 in order to bring the ego vehicle 201 to a safe standstill. According to the present invention, the speed value and the acceleration value of the state of motion of the ego vehicle 201 are taken into account for calculating the length L1 of the safety region.

According to one embodiment, the length L1 is composed of a latency length and a deceleration length. The deceleration length describes the distance that the ego vehicle 201 further moves when a braking process is executed until the ego vehicle 201 comes to a complete standstill. The deceleration length thus depends primarily on the speed value and the braking power of the ego vehicle 201, as well as external conditions such as road adhesion. The latency length, on the other hand, describes a distance that the ego vehicle 201 further drives unbraked between the initiation of the braking process to be executed and the actual execution of the braking process.

According to one embodiment, the speed value for the latency period, i.e. the time period between the occurrence of an event and execution of the braking process, can be adapted based on the acceleration value of the ego vehicle 201. The latency length can thereby be shortened or lengthened accordingly, depending on whether the acceleration describes a reduction in speed or an increase in speed. Accordingly, the speed value adapted according to the acceleration value can be used for calculating the deceleration length, which can also be shortened or lengthened depending on the type of acceleration.

The acceleration value can be taken into account as a constant acceleration.

A width W1 of the safety region 207 running in a perpendicular direction to the direction of travel D1 can also take into account a steering power of the ego vehicle 201, in addition to the speed and the acceleration. The width W1 of the safety region 207 here takes into account possible steering inaccuracies of the ego vehicle 201. The steering inaccuracies of the ego vehicle 201 influence the controlling of the ego vehicle 201. As a result, there is a relationship between the steering inaccuracies of the ego vehicle 201 and the space required for a braking of the ego vehicle 201 to a standstill. Higher steering inaccuracies accordingly lead to wider safety regions 207. According to one embodiment, however, the width W1 of the safety region 207 is at least equal to the vehicle width of the ego vehicle 201.

In the embodiment shown, the safety region 207 is rectangular or trapezoidal. However, this is only an example. The safety region 207 can have any configuration.

To carry out the method according to the present invention for controlling the ego vehicle 201, after calculating the safety region 207 for successive points in time of a travel of the ego vehicle 201 along a planned trajectory it is checked whether the safety region 207 lies completely within the safe driving corridor 205. In the embodiment shown, the safety region 207 calculated with the state of motion of the ego vehicle 201 for the shown position of the ego vehicle 201 is completely within the safe driving corridor 205 calculated taking into account the map data 212 and environmental sensor data 214. If a braking of the ego vehicle 201 now had to be carried out from this position, the ego vehicle 201 would be brought to a standstill within the spatial region of the safety region 207. The ego vehicle 201 would thus remain completely within the safe driving corridor 205.

However, if it is detected during the check that during the traveling of the trajectory the calculated safety region 207 lies at least partially outside the calculated safe driving corridor 205, then a control signal for executing a safety maneuver is output according to the present invention.

The safety maneuver can, for example, include the execution of an emergency braking in which the ego vehicle 201 is automatically brought directly to a safe standstill, deviating from the previously planned travel trajectory. Alternatively or additionally, the safety maneuver can include the execution of a speed reduction in which, again deviating from the previously planned travel trajectory, the speed of the ego vehicle 201 is reduced in such a way that the safety region 207 is again located completely within the safe driving corridor 205. As described above, the length L1 of the safety region 207 describes a braking distance required for a complete braking of the ego vehicle 201 in its corresponding state of motion. In the event of a reduction in the speed of the ego vehicle 201, the required braking distance is correspondingly reduced, so that the length L1 of the safety region 207 is likewise reduced by the speed reduction. By a corresponding reduction in the speed, the length L1 of the safety region 207 can thus be reduced in such a way that, as a result, the correspondingly newly configured safety region 207 is again located within the safe driving corridor 205. Alternatively or additionally, the safety maneuver can comprise a steering movement of the ego vehicle 201 deviating from the travel trajectory. As described above, the orientation and/or shape of the safety region 207 depends on the direction of travel of the ego vehicle 201 in the given state of motion. When the direction of travel of the ego vehicle 201 changes, a new orientation of the safety region 207, which follows the corresponding direction of travel of the ego vehicle 201, is also brought about, as a result of which the newly generated safety region 207 can again be located within the safe driving corridor 205.

According to one embodiment, both the safe driving corridor 205 and the safety region 207 are continuously calculated during the travel of the ego vehicle 201 along the planned travel trajectory, taking into account the map data or the corresponding state of motion of the ego vehicle 201, and adapted to the current map data 212 or the current state of motion.

According to one embodiment, the detected objects can also be classified as potentially dynamic objects. The potentially dynamic objects can be, for example, stationary pedestrians or stopped vehicles which may execute a movement at a future point in time. The possible movement of the potentially dynamic objects can be taken into account when calculating the safe driving corridor, the safety region, or the extended safety region. This enables a more precise calculation of the safe driving corridor and/or the safety regions and, as a result, greater safety of the control of the vehicle. In order to take into account the potential movement of a potentially dynamic object positioned in the environment of the ego vehicle 100, the size of the safe driving corridor 205 can be reduced in order to thus take into account the potential movement of the object in a direction of the potentially dynamic object oriented toward the ego vehicle 201. The area of the extended safety region 217 can be correspondingly increased in order to thereby take into account the possible movement of the object in the direction of the ego vehicle 201.

According to one embodiment, the situation of the safety region 207 in the safe driving corridor 205 can be checked by geometric comparisons of the area of the safety region 207 with the area of the safe driving corridor 205.

In the embodiment shown, an extended safety region 217 is calculated in addition to the safety region 207 based on the state of motion of the ego vehicle 201, taking into account an object movement model 218. The extended safety region 217 is used here to take into account dynamic objects 219 located in the environment of the ego vehicle 201. Here, the object movement model 218 describes average movement behavior or movement patterns in dynamic objects 219 located in the environment of the ego vehicle 201. The extended safety region 217 thus describes a spatial region within which, when an object 219 is detected that is dynamically moving according to the object movement model 218, the ego vehicle 201, in the corresponding state of motion, can be brought to a standstill without collision with the detected object 219.

Due to the taking into account of the dynamic objects 219 in the calculation of the extended safety region 217, the extended safety region 217 has a largely pear-shaped form, in which a width W2 of the extended safety region 217 increases with distance from the ego vehicle 201. The direction of movement D2 of the dynamic object 219 relative to the ego vehicle 201 is taken into account by the width W2, increasing with distance from the ego vehicle 201.

In the embodiment shown, the extended safety region 217 is calculated exclusively for the region within the safe driving corridor 205. This has the result that only dynamic objects 219 within the safe travel corridor 205 are taken into account.

According to the present invention, when calculating the extended safety region 217 it is checked whether a dynamic object 219 is located within the extended safety region 217. If such a location of a dynamic object 219 within the extended safety region 217 is detected, the control signal described above is output to execute the safety maneuver. Due to the taking into account of the movement of the dynamic object 219 in the form of the object movement model 218, the extended safety region 217 has a larger area than the safety region 207. According to the present invention, the extended safety region 217 can be located directly in front of, behind or next to the ego vehicle 201 with respect to the direction of travel D1 of the ego vehicle 201. In this way, collisions with dynamic objects 219 that are located in front of, behind or next to the ego vehicle 201 with respect to the direction of travel D1 of the ego vehicle 201 can be prevented.

According to the present invention, the movement of the dynamic objects 219 is taken into account exclusively by the object movement model 218. A prediction of future behavior of the dynamic objects 219 does not take place. In contrast, the object movement model 218 describes an average movement of dynamic objects 219 within the surrounding environment of the ego vehicle 201.

The taking into account of the extended safety region 217 here serves as a safety function that can be executed in parallel with the prediction of the behavior of the dynamic objects 219.

Immediately upon detection of a dynamic object 219 in the extended safety region 217, the control signal for executing the safety maneuver is output. This is carried out independently of the executed behavior prediction.

The dynamic objects 219 taken into account can, for example, be other road users, and in particular pedestrians.

Figure 2:
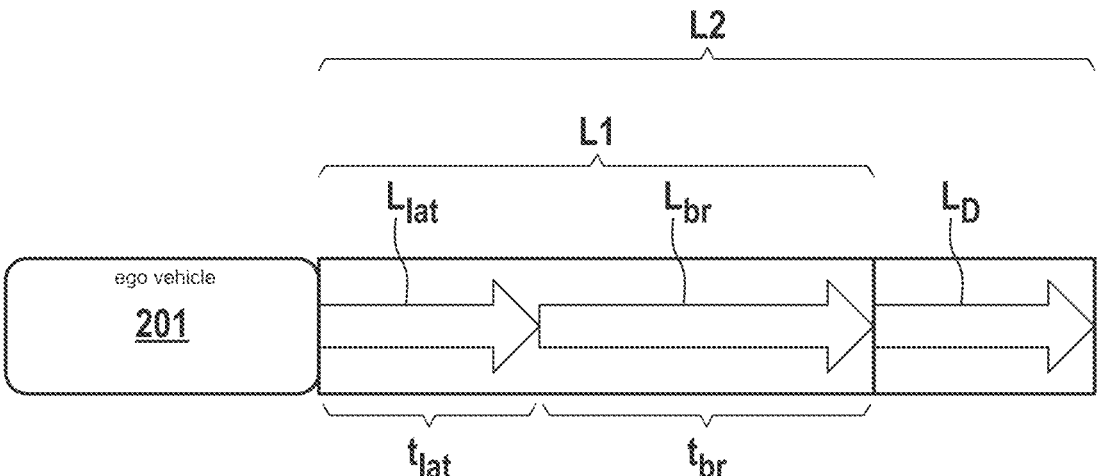
FIG. 2 is a schematic representation of a length of the safety region and of the extended safety region, according to an example embodiment of the present invention.

FIG. 2 is a schematic representation of a length L1, L2 of the safety region 207 and of the extended safety region 217.

According to the embodiment shown, the length L1 of the safety region 207 comprises a latency length $L_{lat}$ and a deceleration length $L_{br}$. The latency length $L_{lat}$ here describes a distance that the ego vehicle 201 further travels unbraked between the detection of a potentially hazardous situation, for example that the safety region 207 is not completely located in the safe driving corridor 205 or that a dynamic object 219 is located in the extended safety region 217, and the actual start of the braking process. The deceleration length $L_{br}$, on the other hand, describes the distance that the ego vehicle 201 further moves during the braking process that has started, before the ego vehicle 201, in its current state of motion, is braked to a complete standstill. The length L2 of the extended safety region 217 comprises the length L1 of the safety region 207 and a differential length $L_D$. The differential length $L_D$ is based on the movement model of the potential movement of the object 219, which takes into account that the movement of the object 219 can be directed toward the ego vehicle 201.

By taking the acceleration value into account in the calculation of the lengths L1, L2 of the safety regions 207,

217, based on the acceleration value the actual speed of the ego vehicle 201 can be adapted during the latency time $T_{lat}$, which describes the time period between the occurrence of an event of the potentially hazardous situation and the start of the braking process and in which the ego vehicle covers the latency length $L_{lat}$, and the deceleration time $T_{br}$, which describes the time period required for the braking process. As a result, the latency length $L_{lat}$ and the deceleration length $L_{br}$ can be reduced if the acceleration value of the state of motion describes a braking process, and can be lengthened if the acceleration value describes an increase in speed.

For the lengths L1 and L2 of the safety region 207 and of the extended safety region, the following apply:

$$L1 = v \cdot t' - \frac{1}{2} a_p t'^2 + \frac{(v - a_p t')^2}{2 a_s}$$

$$L2 = \left( \frac{v}{a_s} + \left( 1 - \frac{a_p}{a_s} \right) t' \right) \cdot v_{ped}$$

$$t' = \min(t, v/a_p)$$

Here, v is the speed of the ego vehicle, $v_{ped}$ is an actual or possible speed of an object, $a_p$ is the acceleration or deceleration planned by the planning module, as is the deceleration caused by the safety module in the form of the safety maneuver, and t is the latency.

Figure 3:
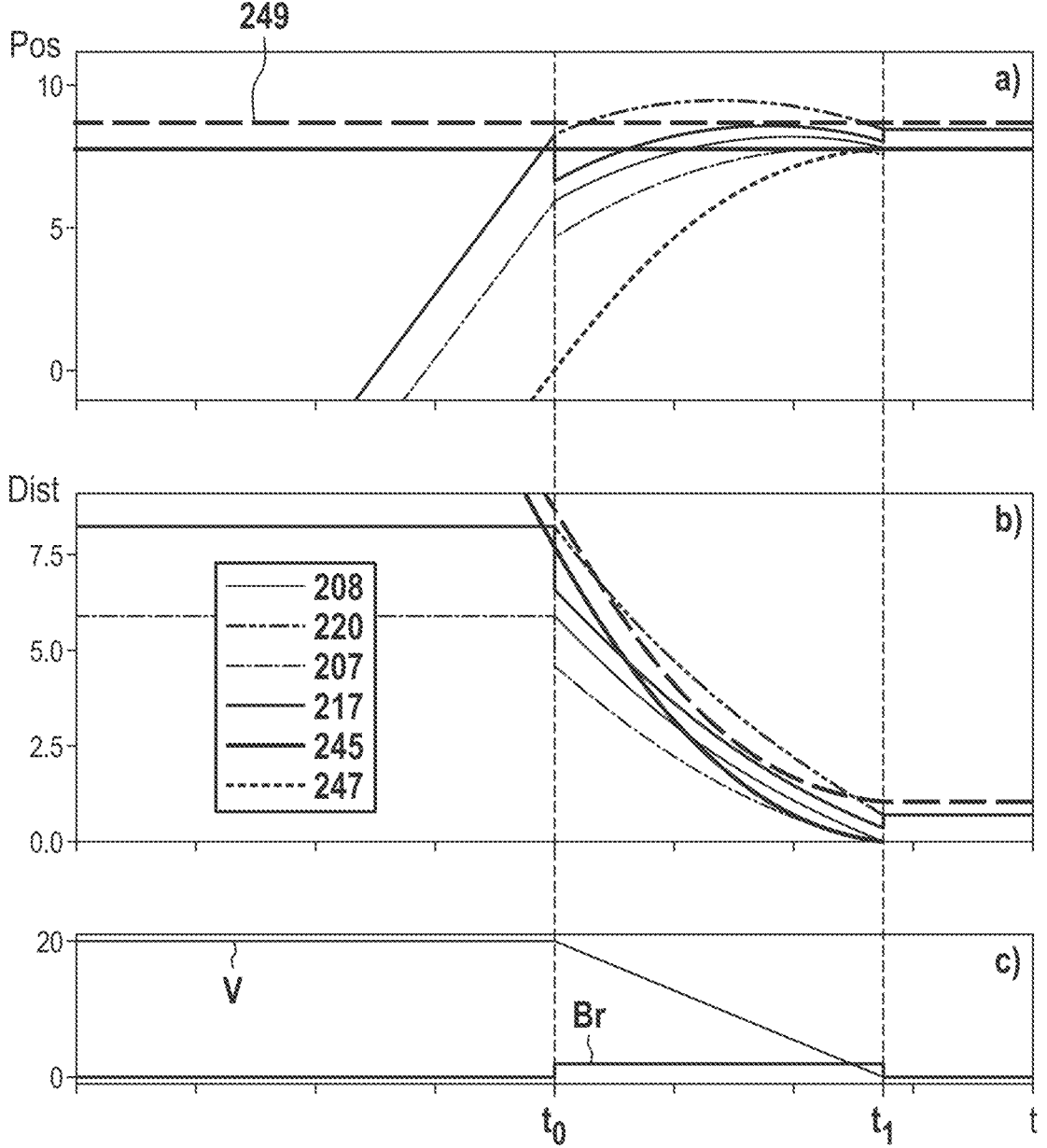
FIG. 3 is a schematic representation of a braking process of the ego vehicle, according to an example embodiment of the present invention.

FIG. 3 is a schematic representation of a braking process of the ego vehicle 201.

FIG. 3 shows advantages of the method according to the present invention in graphical representation. FIG. 3 illustrates that by taking into account the acceleration when calculating the safety region 207 in a braking process in which the ego vehicle 201 is to be brought to a stop in a predetermined end position 245, the safety region 207 does not exceed the end position 245. As described above, to calculate the size, length L1, and width W1 of the safety region 207, the acceleration of the ego vehicle 201 is taken into account in addition to the speed. In a braking process of the ego vehicle 201, the size of the safety region 207 can thus be dynamically reduced and thus adapted to the state of the ego vehicle 201. By adapting or reducing the speed of the ego vehicle 201 by a corresponding applied braking power such that the ego vehicle 201 is brought to a stop in the predetermined end position 245, the size of the safety region 207 is dynamically reduced during the braking process until it is reduced to zero when the ego vehicle 201 is brought to a stop in the predetermined end position. By taking into account the acceleration of the ego vehicle 201 when calculating the safety region 207, it is possible to ensure that the safety region 207 at no time goes beyond the end position 245 predetermined as a stopping point. This can prevent objects or obstacles located behind the end position 245 in the direction of travel from triggering a full braking by overlapping with the safety region 207. Such a full braking would be unnecessary, since the braking process is already designed such that the ego vehicle 201 is brought to a stop before the end position 245. Objects in the direction of travel behind the end position 245 are therefore irrelevant for the safety of the ego vehicle 201, because there is no risk of the ego vehicle 201 colliding with the objects due to the fact that it stops before the end position 245.

When calculating the safety region 207 based solely on the speed of the ego vehicle 201, it is not possible to ensure that the safety region 207 does not extend beyond the end position 245.

In such a case, objects or obstacles located behind the end position 245 could trigger a full braking of the ego vehicle 201 due to an overlap with the safety region 207.

To illustrate the effect described above, the graphics a), b), c) show time courses of various variables during the braking process of the ego vehicle 201, which is intended to bring the ego vehicle 201 to a stop before the predefined end position 245.

Graph c) describes a time profile of a speed V of the ego vehicle 201. Up to time $t_0$, the speed V shows a constant profile. Before the time $t_0$, the ego vehicle 201 therefore travels without being braked, and the braking power Br is zero. The same applies to the time period after the time $t_1$, during which the braking power Br is also zero. The braking power Br describes the acceleration value within the meaning of the present invention. During the time period between the time $t_0$ and the time $t_1$, a braking process takes place. A constant braking power Br is applied during the braking process. A constant reduction of the speed V is thereby effected. The speed V is reduced to a numerical value of zero by the braking process during the period between the times $t_0$, $t_1$, resulting in a complete deceleration of the ego vehicle 201.

Graph a) shows a time profile of a position Pos of the ego vehicle 201 relative to an end position 245. The end position 245 here describes a positioning on a road traveled by the ego vehicle 201 before the ego vehicle is to be brought to a stop.

Curve 247 shows the time profile of the position Pos of a front of the ego vehicle 201. The vehicle front 247 approaches the end position 245 uniformly, the braking process between the times $t_0$, $t_1$ and the corresponding speed reduction down to the speed V=0 causing the vehicle front 247 to be positioned at the end position 245 at the time $t_1$ and thus ensuring that the ego vehicle 201 does not exceed the end position 245.

In curve 207, the time profile of a safety region 207 is also shown, which was calculated according to the present invention based on the speed value and the acceleration value of the state of motion of the ego vehicle 201. As already stated above, the size of the safety region 207 is dynamically adapted by the braking process. This ensures that the position of the safety region 207 (the position here refers to the outermost edge of the safety region 207 in the direction of travel) is brought closer to the end position without the safety region 207 exceeding the end position 245.

Furthermore, curve 217 shows the time profile of an extended safety region 217, which was also calculated according to the present invention taking into account the speed value and the acceleration value of the state of motion.

In addition, curve 208 shows the time profile of a safety region 208, which was calculated solely based on the speed value of the state of motion of the ego vehicle 201, and curve 220 shows a time profile of an extended safety region 220, which was also calculated solely taking into account the speed value of the motion state.

Up to time $t_0$, the safety regions 207, 208 and the extended safety regions 217, 220 show a linear profile. In this region, the vehicle travels with a constant speed V and a vanishing acceleration. The safety regions 207, 208 and extended safety regions 217, 220 thus approach the end position 245 uniformly. Since the acceleration in this region is zero, the safety regions 207, 208 are identical and the extended safety regions 217, 220 are likewise identical.

The braking process of the planner starts at time to. At this time, the safety regions 208, 207 are still at a remove from the end position 245. Due to the distance of the safety regions 208, 207 from the end position, no safety maneuver is triggered according to the present invention. This would only occur when the safety regions 207, 208 go beyond the end position 245.

At time $t_0$, when the braking process is initiated and a uniform speed reduction takes place, the safety region 208 and the extended safety region 220, each calculated solely based on the speed value of the state of motion, show a non-linear profile in which the safety regions 208, 220 approach the end position 245 with a reduced slope and the position of the safety region 208 intersects the curves of the end position 245 and the position of the extended safety region 220 intersects the curves of the extended end position 249. In this way, a static obstacle behind the end position 245 could trigger an emergency braking. This is not desired, as the situation of a static obstacle behind the end position 245 is not critical.

Due to the braking process starting at time $t_0$ and the corresponding acceleration, which differs from 0 due to the braking power Br, the safety range 207 and the extended safety range 217, which are each calculated taking into account the speed value and the acceleration value of the state of motion, have in contrast a step-shaped profile, so that in the range between the times $t_0$, $t_1$, in which the braking process is carried out, the safety range 207 and the safety range 208 as well as the extended safety range 217 and the extended safety range 220 have a different profile. By considering the acceleration in the form of the braking power Br, the dimensions, in particular the lengths L1, L2 of the safety region 207 and of the extended safety region 217, can be reduced. By taking into account the braking power Br, the speed reduction during the braking process between the times $t_0$, $t_1$ can be taken into account when calculating the dimensions of the safety region 207 or of the extended safety region 217. By taking into account the braking power Br as a constant acceleration value, it is possible to take into account, during the braking process between the times $t_0$ and $t_1$, the reduction in the speed V of the ego vehicle 201 when calculating the safety regions 207, 217. The required braking distances, which each also contribute to defining the lengths L1, L2 of the safety regions 207, 217, can also be reduced due to the reduced speed V. In addition, the latency length $L_{lat}$ can be reduced due to the braking process already used, because the latency time $T_{lat}$ is shortened due to the braking process already used.

Graph a) also shows an extended end position 249. The extended end position 249 describes an end position for the extended safety region 217. If the extended end position 249 is exceeded by the extended safety region 217, a safety maneuver is triggered according to the present invention. According to the present invention, the extended safety region 217 is larger than the safety region 207 and includes it. The extended end position 249 is accordingly further away from the ego vehicle 201 than is the end position 245.

Due to the reduction of the dimensions of the safety region 207 by taking into account the acceleration value in the form of the braking power Br, in the embodiment shown the dimension and in particular the length L1 of the safety region 207 can be reduced in such a way that the safety region 207 does not extend beyond the end position 245 at any time. Thus, no safety maneuver is triggered by the safety region 207.

In contrast, the safety region 208, which is calculated solely from the speed value of the state of motion, extends beyond the end position 245 despite the reduction in speed V of the ego vehicle 201. Because of the overshooting of the end position 245 by the safety region 208, a safety maneuver can be triggered based on the safety region 208.

Analogously to the safety regions 207, 208, in the extended safety regions 217, 220 there is also a reduction in the slope of the curves within the braking process between the times $t_0$, $t_1$. By taking into account the acceleration value in the form of the braking power Br, the extended safety range 217 also shows a step-shaped profile in the area of the time $t_0$ at which the braking process is initiated, and approaches the extended end position 249 without exceeding it. In contrast, the extended safety region 220, which is calculated solely on the basis of the speed value, does not show a step-shaped profile. Furthermore, the extended safety region 220 exceeds the extended end position 249, so that a safety maneuver can be triggered based on this if a corresponding object is present there.

Graph a) thus shows that due to the safety regions 207, 217, which are calculated according to the present invention based on the speed values and the acceleration values of the state of motion, and which can be calculated accordingly with smaller dimensions due to the braking power Br taken into account compared with the safety regions 208, 220, which are calculated solely on the speed values of the state of motion, unnecessary safety maneuvers can be avoided due to the smaller dimensions of the safety regions 207, 217. Graph a) clearly shows that, in the embodiment shown, the ego vehicle 201 is brought to a standstill at the end position 245. Nevertheless, the safety regions 208, 220 exceed the end position 245 or the extended end position 249, so that a safety maneuver would have to be carried out here in accordance with the present invention if a corresponding object were present. By taking into account the acceleration values within the braking process, however, the safety regions 207, 217 can be made smaller. This means that, as shown in graph a), the safety region 207 does not exceed the end position 245 and the extended safety region 217 does not exceed the extended end position 249, and therefore no safety maneuver would have to be performed.

Graph b) shows a time profile of a distance Dist to the end position 245 of the variables described in graph a). The statement in graph b) is identical to the statement in graph a), namely that by taking into account the acceleration values of the state of motion, the safety regions 207, 217 correspondingly calculated with smaller dimensions have the result that unnecessary safety maneuvers based on safety regions that are dimensioned too large can be avoided.

This is advantageous, because if a safety region 208 exceeds the end position 245 at a time, a static obstacle behind the end position 245 could trigger an emergency braking. This is not desired, as the situation of a static obstacle behind the end position 245 is not critical.

Comparable reasoning holds for the extended safety region 220. The extended end position 249 must not be exceeded by the extended safety region 217 during this maneuver, because otherwise a potentially moving obstacle could trigger an emergency braking.

Figure 4:
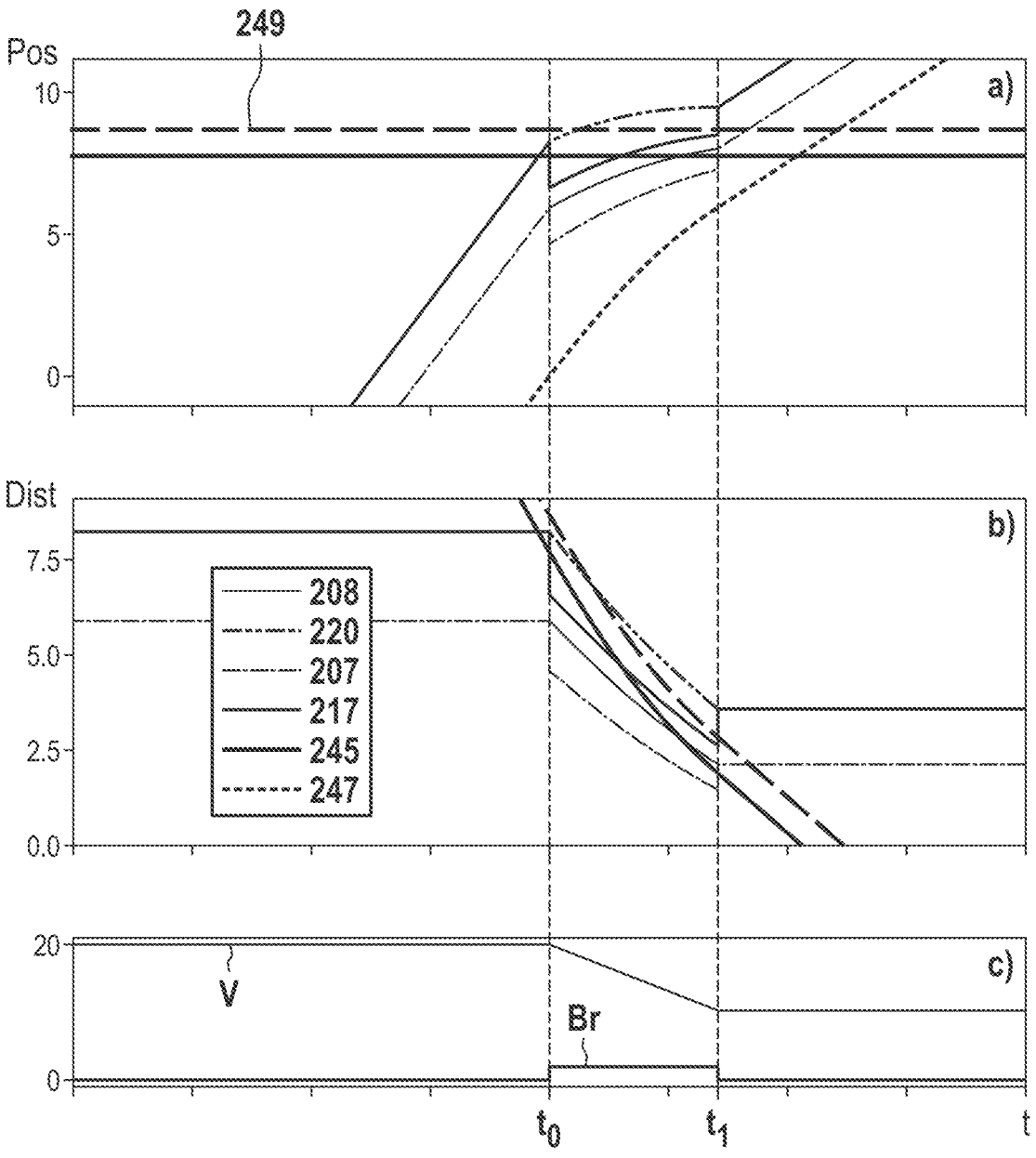
FIG. 4 is a further schematic representation of a braking process of the ego vehicle, according to an example embodiment of the present invention.

FIG. 4 is a further schematic representation of a braking process of the ego vehicle 201.

FIG. 4 illustrates a driving situation in which the braking process is interrupted before the ego vehicle 201 comes to a complete stop before the end position 245.

In this case, analogous to the case in FIG. 3, first the size of the safety region 207 is reduced, taking into account speed and acceleration of the ego vehicle 201 during the braking process. When the braking process is interrupted or terminated, after which the travel of the ego vehicle 201 is continued with a speed that is reduced but is different from zero, the size of the safety region is increased suddenly. As a result, the safety region 207 is immediately increased again to a sufficient size due to the continued travel, in order to provide the necessary safety for the travel of the ego vehicle 201.

As the safety region 207 is enlarged suddenly after the braking process is terminated, threatening obstacles can be detected immediately and a corresponding emergency braking can be introduced. Since the brakes are not yet completely opened again immediately after the braking process has ended, the braking time is drastically reduced at this moment. A safe braking of the ego vehicle 201 without colliding with an object located within the safety region 207 can thus be achieved. Although the safety region 207 thus has a greatly reduced size compared with the safety region 208, which is calculated solely on the basis of the speed of the ego vehicle 201, the safety of the ego vehicle 201 can be ensured by the abrupt increase in the safety region 207 upon termination of the braking process and by the reduced braking duration due to the not yet completely opened brakes. The calculation of the safety region 207 based on the speed and acceleration of the ego vehicle 201 thus provides a sufficient safety performance that corresponds to the safety performance of the larger safety region 208, which is calculated taking into account only the speed of the ego vehicle 201. The same applies to the extended safety region 217, which also has a performance comparable with that of the extended safety region 220.

In FIG. 4, the braking process initiated at time $t_0$ is interrupted or terminated at time $t_1$. At this point in time, the speed of the ego vehicle 201 is not equal to zero, and the travel continues. At time $t_1$ the safety region 207 is suddenly enlarged and thus extends beyond the end position 245. Objects located behind the end position 245 can represent potential hazards due to the continued travel. Due to the sudden enlargement of the safety region 207 up to behind the predetermined end position 245, these objects can be detected by the safety region 207 and trigger the emergency braking. Because the brakes are not fully open, braking can be initiated quickly enough, without a collision occurring.

Figure 5:
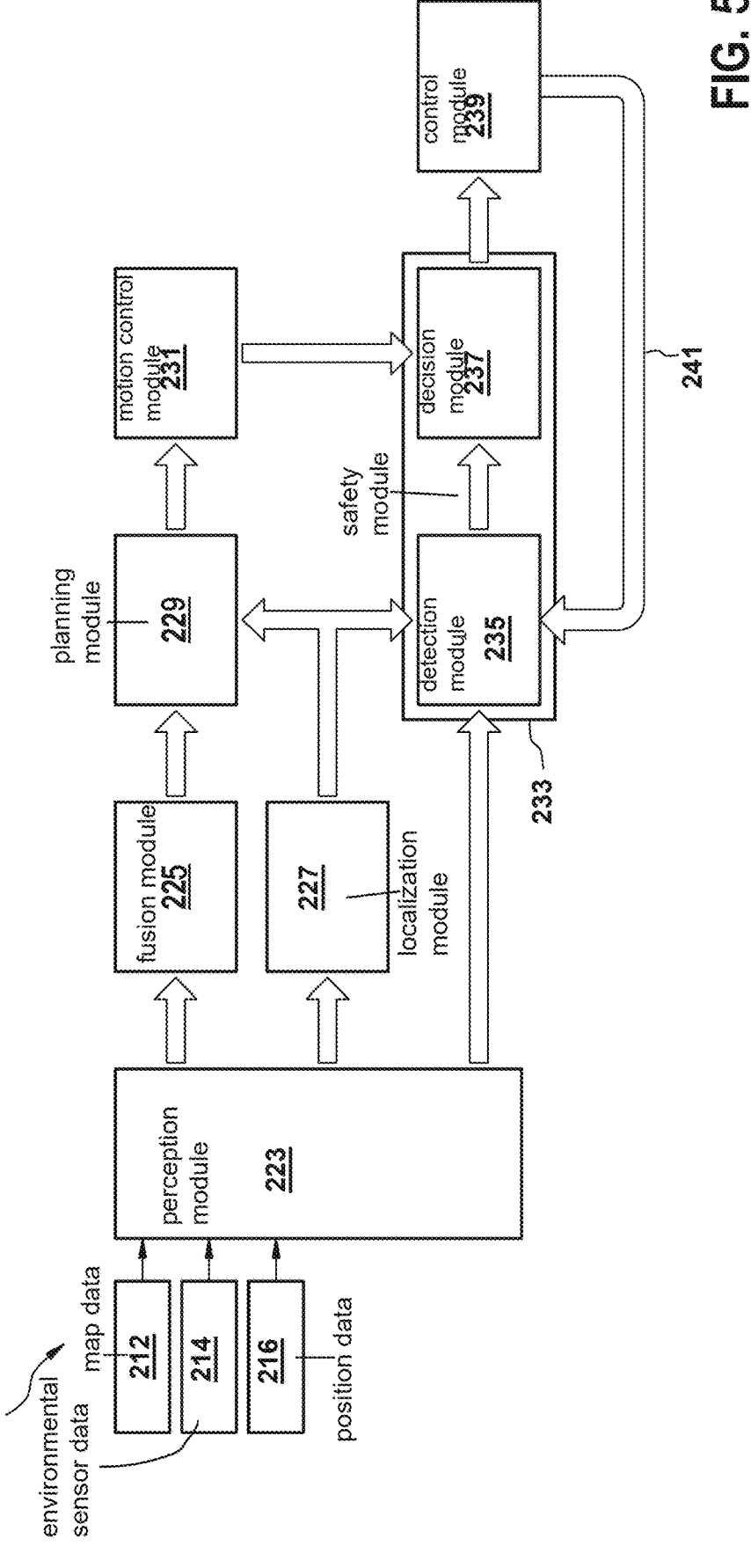
FIG. 5 is a schematic representation of a control architecture of a system for controlling an ego vehicle according to one example embodiment of the present invention.

FIG. 5 is a schematic representation of a control architecture 221 of a system 200 for controlling an ego vehicle 201 according to one embodiment.

In the embodiment shown, the architecture 221 comprises a perception module 223, a fusion module 225, a localization module 227, a planning module 229, a motion control module 231, a safety module 233 with a detection module 235 and a decision module 237, and a control module 239. The perception module 223 performs an environment detection based on map data 212 of a map representation, environment sensor data 214, and position data 216. Based on the results of the perception module 223, the fusion module 225 and the localization module 227 execute additional processing processes which are required by the planning module 229 to plan a behavior or a travel trajectory to be executed. Based on the planning of the planning module 229, a corresponding movement controlling of the ego vehicle 201 by the movement control module 231 takes place, and corresponding control signals are output by the control module 239 to control the ego vehicle 201. In the embodiment shown, the control signals are output to the control module 239 via the safety module 233. In this case, the safety module 233 executes a corresponding safety check in the form of the safety regions 207, 217 of the embodiments described above.

Based on the results of the perception module 223 and the environmental detection carried out, the detection module 235 calculates a safe driving corridor 205 according to the present invention. Furthermore, the detection module 235 calculates safety regions 207 or extended safety regions 217 according to the present invention based on speed values and/or acceleration values 241 of the state of motion of the ego vehicle 201. Furthermore, the detection module 235 carries out a check of whether the safety regions 207 are located completely within the calculated safe driving corridors 205, or whether dynamic objects 219 detected by the environment detection of the perception module 223 are located within the calculated extended safety regions 217.

Based on the checks of the detection module 235, the decision module 237 decides whether a safety maneuver is to be carried out. If the decision module 237 decides that such a safety maneuver is to be executed because, for example, the safety region 207 is located at least partially outside the calculated safe driving corridor 205, and/or because a detected dynamic object 219 is located within the extended safety region 217, corresponding control signals are output to the control module 239 for executing the safety maneuver. The control signals of the movement control module 231 are ignored in such a case, and the prioritized safety maneuver is carried out instead. If the decision module 237 decides that a corresponding safety maneuver is not to be executed, the safety module 233 forwards the control signals of the motion control module 231 to the control module 239, and the controlling of the ego vehicle 201 can be executed according to the behavior planned by the planning module 229.

In the embodiment shown, the detection module 235 receives the speed or acceleration values 241 directly from the control module 239. The speed or acceleration values 241 are based here on measured values of a corresponding sensor system for measuring the speed or acceleration of the ego vehicle 201.

Figure 6:
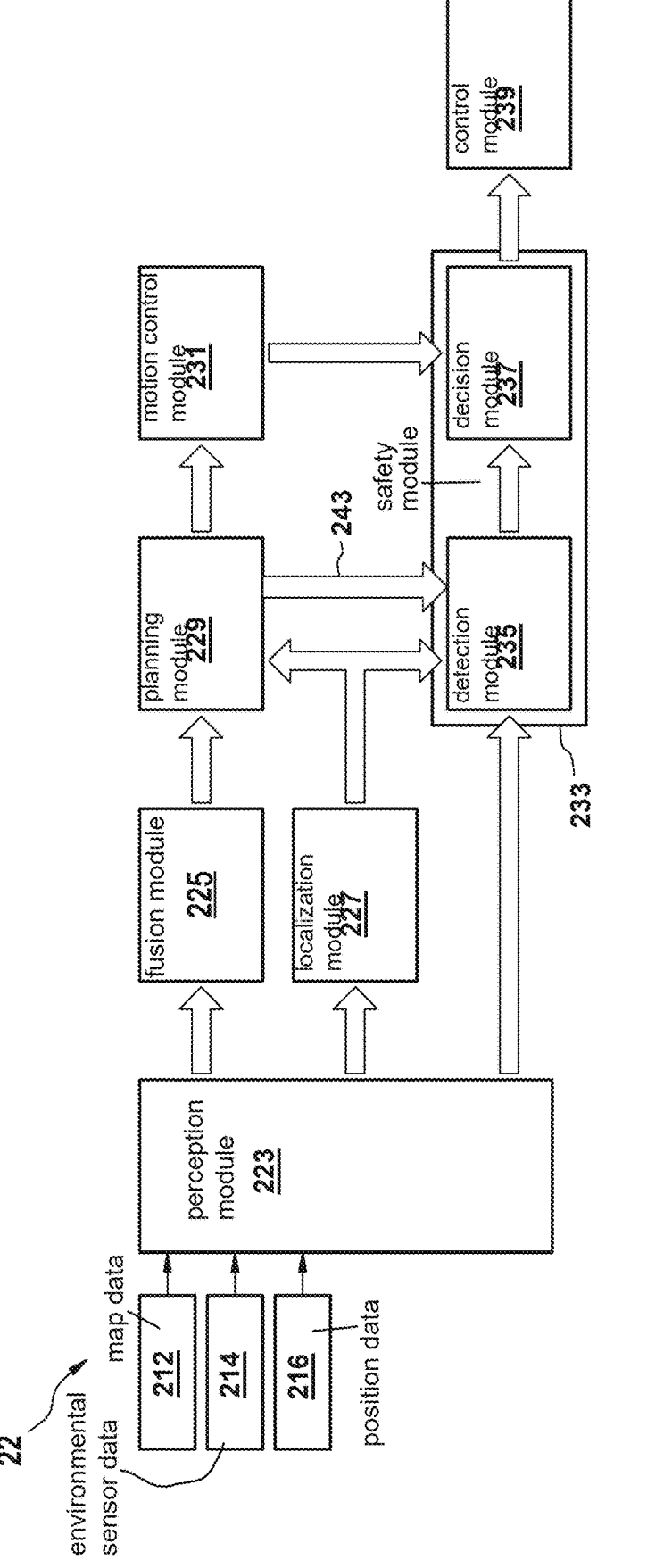
FIG. 6 is a further schematic representation of the control architecture of the system for controlling an ego vehicle according to a further embodiment of the present invention.

FIG. 6 is a further schematic representation of the control architecture 221 of the system 200 for controlling an ego vehicle 201 according to a further embodiment.

The embodiment shown is based on the embodiment in FIG. 5 and comprises all features described there. Deviating from the embodiment in FIG. 5, the detection module 235 does not receive the speed or acceleration values 243 from a corresponding sensor system of the control module 239, but directly from the planning module 229. The speed or acceleration values 243 are thus based on the behavior planned by the planning module 229 and thus describe a planned speed or a planned acceleration.

FIG. 7 is a flowchart of a method 100 for controlling an ego vehicle 201.

According to the present invention, in a first method step 101, map data 212 of a map representation of a surrounding environment of the ego vehicle 201 are first received. The map data 212 here map at least one lane 203 traveled by the ego vehicle 201.

In a further method step 125, position data 216 are also received and a position of the ego vehicle 201 relative to the map representation is determined.

In a further method step 123, environment sensor data 214 of at least one environment sensor 213 of the ego vehicle 201 are received and an object recognition is executed based on the environment sensor data 214.

In a further method step 127, a state of motion of the ego vehicle 201 is determined. The state of motion of the ego vehicle 201 is defined here at least by a speed value and an acceleration value of the ego vehicle 201. In the embodiment shown, the state of motion further comprises an item of position information of the ego vehicle 201.

In the embodiment shown, in a further method step 103 a safe driving corridor 205 is calculated based on the received map data 212 in combination with the position of the ego vehicle 201 relative to the map representation and taking into account the objects 211 determined by the executed object recognition. Here the safe driving corridor 205 describes a spatial region that can be traveled by the ego vehicle 201 without collision.

Furthermore, a safety region 207 of the ego vehicle 201 is calculated in a method step 105 based on the state of motion of the ego vehicle 201. The safety region 207 describes a spatial region in which the ego vehicle, in the corresponding state of motion, can be brought to a standstill. According to the present invention, the safety region 207 is characterized by the speed value and the acceleration value of the state of motion of the ego vehicle 201.

In the embodiment shown, in a further method step 111 an extended safety region 217 is also calculated taking into account the state of motion of the ego vehicle 201 and taking into account an object movement model 218. The extended safety region 217 describes a spatial region in which the ego vehicle 201 can be brought to a standstill without a collision with a dynamic object 219 within the environment of the ego vehicle 201.

According to one embodiment, the speed value and the acceleration value are updated during the travel of the ego vehicle 201. Based on the updated speed and acceleration values, the dimensions of the safety regions 207, 217 can be adapted.

In a further method step 107, it is checked whether the safety region 207 calculated in method step 105 is located completely in the safe driving corridor 205 calculated in method step 103.

For this purpose, in a method step 129 a geometric comparison of the surface of the safety region 207 and the surface of the safe driving corridor 205 is determined.

In a further method step 113, it is checked whether a dynamic object 219 is located in the extended safety region 217 calculated in method step 111.

For this purpose, in the embodiment shown, in the method step 129 a geometric comparison is carried out of a surface of the extended safety region 217 and a position of the dynamic object 219 recognized by the object recognition.

In a further method step 109, a control signal 255 for executing a safety maneuver is output if it is detected in method step 107 that the safety region 207 is not completely located in the safe travel corridor 205 and/or if it is detected in method step 113 that an object 211, 219 is located in the extended safety region 217. The safety maneuver can comprise an emergency braking, a speed reduction, or a steering maneuver.

For this purpose, in a method step 117 an emergency braking of the ego vehicle 201 is carried out. The emergency braking is preferably effected by the safety module 233. The safety module 233 can thus intervene in a prioritized manner in the controlling of the ego vehicle 201 planned by the planning module 229.

Alternatively or additionally, in a method step 119 a speed reduction can be carried out. Here the speed reduction is not an emergency braking in which the ego vehicle 201 is brought to a stop. The speed reduction merely reduces the speed of the ego vehicle 201 in such a way that the safety region 207 is once again completely located in the safe driving corridor 205 and/or that the object 219 is no longer located in the extended safety region 117.

Alternatively or additionally, in a method step 121 a steering movement of the ego vehicle 201 can be initiated.

As a result, the safety region 207 can again be completely located in the safe travel corridor 205 and/or the extended safety region 217 can be modified in such a way that the object 219 is no longer located in the extended safety region 217.

In a further method step 115, the execution of the safety maneuver in method step 109 can be terminated or prevented if, after adapting the length L1 and/or width W1, the safety region 207 is located completely in the safe driving corridor 205 and/or if, after adapting the length L2 and/or width W2 of the extended safety region 217, the object 219 is located outside the extended safety region 217.

The environmental sensor data can comprise LiDAR data, radar data, camera data, or acoustic data.

The static objects 211 can comprise infrastructure objects or parked vehicles; the dynamic objects 219 can comprise further road users, in particular pedestrians.

FIG. 8 is a schematic representation of a computer program product 300 comprising commands that, when the program is executed by a computing unit, cause this computing unit to carry out the method 100 for controlling an ego vehicle 201.

In the embodiment shown, the computer program product 300 is stored on a storage medium 301. The storage medium 301 can be any storage medium from the related art.

What is claimed is:

1. A method for controlling an ego vehicle, comprising the following steps:

receiving map data of a map representation of a surrounding environment of an ego vehicle, wherein the map data of the map representation map at least one roadway traveled by the ego vehicle;

determining a safe driving corridor of the ego vehicle based on the map data of the map representation, wherein the safe driving corridor describes a spatial region that can be traveled by the ego vehicle without collision, and wherein the safe driving corridor is limited at least by boundaries of the roadway;

determining a safety region of the ego vehicle based on a state of motion of the ego vehicle, wherein the state of motion is defined at least by a speed value of the ego vehicle and an acceleration value of the ego vehicle, wherein the safety region defines a spatial region in which, in a given state of motion, the ego vehicle can be safely brought to a standstill, and wherein a length of the safety region oriented along a direction of travel of the ego vehicle and/or a width of the safety region oriented perpendicularly along the direction of travel are determined taking into account a speed of the ego vehicle and an acceleration of the ego vehicle;

checking whether the safety region is located completely within the safe driving corridor during travel of the ego vehicle along a travel trajectory; and outputting a control signal for executing a safety maneuver when the safety region is located at least partially outside the safe driving corridor, wherein the length and/or width of the safety region are dynamically increased or decreased during travel of the ego vehicle based on current or planned acceleration and/or deceleration.

2. The method according to claim 1, further comprising the following steps:

determining an extended safety region based on the speed value and/or the acceleration value of the state of motion of the ego vehicle and taking into account an object movement model for dynamic objects, wherein the object movement model includes a description of an average movement of dynamic objects located in the surrounding environment of the ego vehicle, wherein the extended safety region defines a spatial region in which, in a given state of motion, the ego vehicle can be brought to a standstill without a collision with a dynamic object moving at least partially in a direction of the ego vehicle according to the object movement model, and wherein a length of the extended safety region and/or a width of the extended safety region are determined taking into account the speed value of the ego vehicle and the acceleration value of the ego vehicle;

checking whether a dynamic object located in the surrounding environment of the ego vehicle is located within the extended safety region; and outputting the control signal for executing the safety maneuver when the safety region is located at least partially outside the safe driving corridor, and/or when at least one dynamic object is located in the extended safety region.

3. The method according to claim 2, wherein the length of the safety region and/or the length of the extended safety region and/or the width of the safety region and/or the width of the extended safety region are adapted during the travel of the ego vehicle based on a current speed value and/or a current acceleration value of a current state of motion of the ego vehicle.

4. The method according to claim 3, further comprising the following steps:

terminating and/or not executing the safety maneuver: (i) when, after adapting the length of the safety region and/or the width of the safety region, the safety region is completely located in the safe travel corridor, and/or (ii) when, after adapting the length of the extended safety region and/or the width of the extended safety region, the object is located outside the extended safety region.

5. The method according to claim 2, wherein a Kalman filter is used to determine a future speed value and/or a future acceleration value of a future state of motion of the ego vehicle based on the speed value and/or the acceleration value of the state of motion of the ego vehicle, and wherein the length of the safety region and/or the length of the extended safety region and/or the width of the safety region and/or the width of the extended safety region, are adapted based on the future speed and/or acceleration of the ego vehicle.

6. The method according to claim 2, wherein the acceleration value includes an acceleration value planned by a planning module and/or an acceleration value of the ego vehicle measured by a corresponding sensor system.

7. The method according to claim 6, wherein the planned acceleration value and/or the current acceleration value of the ego vehicle are taken into account in a common processing path or in two parallel processing paths for determining the safety region and/or the extended safety region.

8. The method according to claim 1, wherein the acceleration value of the state of motion describes a speed reduction or a speed increase of the ego vehicle.

9. The method according to claim 1, wherein the safety maneuver includes:

executing an emergency braking in which the ego vehicle is brought to a safe standstill, deviating from a planned travel trajectory; and/or executing a speed reduction, deviating from a planned travel trajectory of the ego vehicle, wherein the speed reduction takes place in such a way that the safety region is again located completely in the safe driving corridor; and/or executing a steering movement, deviating from the planned travel trajectory of the ego vehicle, wherein the steering movement takes place in such a way that the safety region is located completely in the safe driving corridor.

10. The method according to claim 1, wherein the state of motion further includes an item of steering information relating to a possible steering inaccuracy of the ego vehicle, and wherein the width of the safety region is determined taking into account the steering inaccuracy of the ego vehicle.

11. A method for controlling an ego vehicle, comprising the following steps:

receiving map data of a map representation of a surrounding environment of an ego vehicle, wherein the map data of the map representation map at least one roadway traveled by the ego vehicle;

determining a safe driving corridor of the ego vehicle based on the map data of the map representation, wherein the safe driving corridor describes a spatial region that can be traveled by the ego vehicle without collision, and wherein the safe driving corridor is limited at least by boundaries of the roadway;

determining a safety region of the ego vehicle based on a state of motion of the ego vehicle, wherein the state of motion is defined at least by a speed value of the ego vehicle and an acceleration value of the ego vehicle, wherein the safety region defines a spatial region in which, in a given state of motion, the ego vehicle can be safely brought to a standstill, and wherein a length of the safety region oriented along a direction of travel of the ego vehicle and/or a width of the safety region oriented perpendicularly along the direction of travel are determined taking into account a speed of the ego vehicle and an acceleration of the ego vehicle;

checking whether the safety region is located completely within the safe driving corridor during travel of the ego vehicle along a travel trajectory;

outputting a control signal for executing a safety maneuver when the safety region is located at least partially outside the safe driving corridor, determining an extended safety region based on the speed value and/or the acceleration value of the state of motion of the ego vehicle and taking into account an object movement model for dynamic objects, wherein the object movement model includes a description of an average movement of dynamic objects located in the surrounding environment of the ego vehicle, wherein the extended safety region defines a spatial region in which, in a given state of motion, the ego vehicle can be brought to a standstill without a collision with a dynamic object moving at least partially in a direction of the ego vehicle according to the object movement model, and wherein a length of the extended safety region and/or a width of the extended safety region are determined taking into account the speed value of the ego vehicle and the acceleration value of the ego vehicle;

checking whether a dynamic object located in the surrounding environment of the ego vehicle is located within the extended safety region; and outputting the control signal for executing the safety maneuver when the safety region is located at least partially outside the safe driving corridor, and/or when at least one dynamic object is located in the extended safety region, wherein the length of the safety region and/or the length of the extended safety region is given by a latency length and a deceleration length, wherein the deceleration length describes a distance required to brake the ego vehicle to a complete stop, and wherein the latency length describes a distance which the ego vehicle continues to travel without deceleration between an initiation time at which an event occurs that is intended to trigger a deceleration of the ego vehicle and a deceleration time at which the deceleration is actually effected, and wherein a speed of the ego vehicle during a latency period is determined taking into account the acceleration value.

12. A method for controlling an ego vehicle, comprising the following steps:

receiving map data of a map representation of a surrounding environment of an ego vehicle, wherein the map data of the map representation map at least one roadway traveled by the ego vehicle;

determining a safe driving corridor of the ego vehicle based on the map data of the map representation, wherein the safe driving corridor describes a spatial region that can be traveled by the ego vehicle without collision, and wherein the safe driving corridor is limited at least by boundaries of the roadway;

determining a safety region of the ego vehicle based on a state of motion of the ego vehicle, wherein the state of motion is defined at least by a speed value of the ego vehicle and an acceleration value of the ego vehicle, wherein the safety region defines a spatial region in which, in a given state of motion, the ego vehicle can be safely brought to a standstill, and wherein a length of the safety region oriented along a direction of travel of the ego vehicle and/or a width of the safety region oriented perpendicularly along the direction of travel are determined taking into account a speed of the ego vehicle and an acceleration of the ego vehicle;

checking whether the safety region is located completely within the safe driving corridor during travel of the ego vehicle along a travel trajectory;

outputting a control signal for executing a safety maneuver when the safety region is located at least partially outside the safe driving corridor, determining an extended safety region based on the speed value and/or the acceleration value of the state of motion of the ego vehicle and taking into account an object movement model for dynamic objects, wherein the object movement model includes a description of an average movement of dynamic objects located in the surrounding environment of the ego vehicle, wherein the extended safety region defines a spatial region in which, in a given state of motion, the ego vehicle can be brought to a standstill without a collision with a dynamic object moving at least partially in a direction of the ego vehicle according to the object movement model, and wherein a length of the extended safety region and/or a width of the extended safety region are determined taking into account the speed value of the ego vehicle and the acceleration value of the ego vehicle;

checking whether a dynamic object located in the surrounding environment of the ego vehicle is located within the extended safety region; and outputting the control signal for executing the safety maneuver when the safety region is located at least partially outside the safe driving corridor, and/or when at least one dynamic object is located in the extended safety region, wherein a Kalman filter is used to determine a future speed value and/or a future acceleration value of a future state of motion of the ego vehicle based on the speed value and/or the acceleration value of the state of motion of the ego vehicle, and wherein the length of the safety region and/or the length of the extended safety region and/or the width of the safety region and/or the width of the extended safety region, are adapted based on the future speed and/or acceleration of the ego vehicle, wherein the length of the extended safety region oriented in the direction of travel of the ego vehicle and/or the width of the extended safety region oriented perpendicularly to the direction of travel of the ego vehicle corresponds to a path distance within which the ego vehicle, in the given state of motion, can be brought to a standstill with maximum deceleration power without colliding with an object moving towards the ego vehicle at least partially in an opposite direction of travel or in a direction perpendicular to the direction of travel, according to the movement model.

13. A computing unit configured to control an ego vehicle, the computing unit configured to:

receive map data of a map representation of a surrounding environment of an ego vehicle, wherein the map data of the map representation map at least one roadway traveled by the ego vehicle;

determine a safe driving corridor of the ego vehicle based on the map data of the map representation, wherein the safe driving corridor describes a spatial region that can be traveled by the ego vehicle without collision, and wherein the safe driving corridor is limited at least by boundaries of the roadway;

determine a safety region of the ego vehicle based on a state of motion of the ego vehicle, wherein the state of motion is defined at least by a speed value of the ego vehicle and an acceleration value of the ego vehicle, wherein the safety region defines a spatial region in which, in a given state of motion, the ego vehicle can be safely brought to a standstill, and wherein a length of the safety region oriented along a direction of travel of the ego vehicle and/or a width of the safety region oriented perpendicularly along the direction of travel are determined taking into account a speed of the ego vehicle and an acceleration of the ego vehicle;

check whether the safety region is located completely within the safe driving corridor during travel of the ego vehicle along a travel trajectory; and output a control signal for executing a safety maneuver when the safety region is located at least partially outside the safe driving corridor, wherein the length and/or width of the safety region are dynamically increased or decreased during travel of the ego vehicle based on current or planned acceleration and/or deceleration.

14. A non-transitory computer readable medium on which is stored a computer program for controlling an ego vehicle, the computer program, when executed by a data processor, causing the data processor to perform the following steps:

receiving map data of a map representation of a surrounding environment of an ego vehicle, wherein the map data of the map representation map at least one roadway traveled by the ego vehicle;

determining a safe driving corridor of the ego vehicle based on the map data of the map representation, wherein the safe driving corridor describes a spatial region that can be traveled by the ego vehicle without collision, and wherein the safe driving corridor is limited at least by boundaries of the roadway;

determining a safety region of the ego vehicle based on a state of motion of the ego vehicle, wherein the state of motion is defined at least by a speed value of the ego vehicle and an acceleration value of the ego vehicle, wherein the safety region defines a spatial region in which, in a given state of motion, the ego vehicle can be safely brought to a standstill, and wherein a length of the safety region oriented along a direction of travel of the ego vehicle and/or a width of the safety region oriented perpendicularly along the direction of travel are determined taking into account a speed of the ego vehicle and an acceleration of the ego vehicle;

checking whether the safety region is located completely within the safe driving corridor during travel of the ego vehicle along a travel trajectory; and outputting a control signal for executing a safety maneuver when the safety region is located at least partially outside the safe driving corridor, wherein the length and/or width of the safety region are dynamically increased or decreased during travel of the ego vehicle based on current or planned acceleration and/or deceleration.

\* \* \* \* \*